May 27, 1924.
W. WRIGHT
COMPUTING MACHINE AND ATTACHMENT TO TYPEWRITERS
Filed Aug. 16, 1907
9 Sheets-Sheet 1
1,495,967
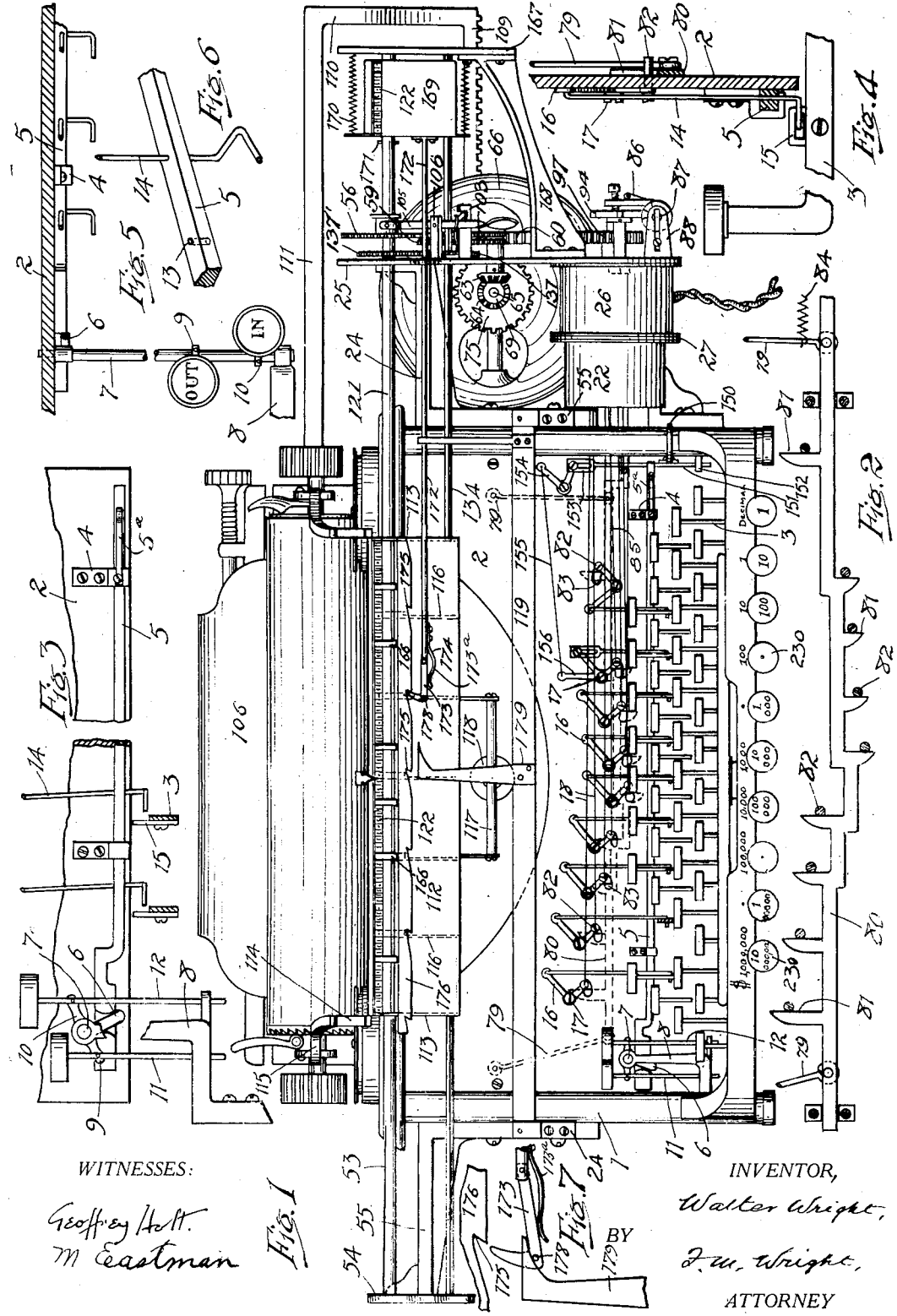
WITNESSES:
Geoffrey Holt
M Eastman
INVENTOR,
Walter Wright,
BY
F. M. Wright,
ATTORNEY

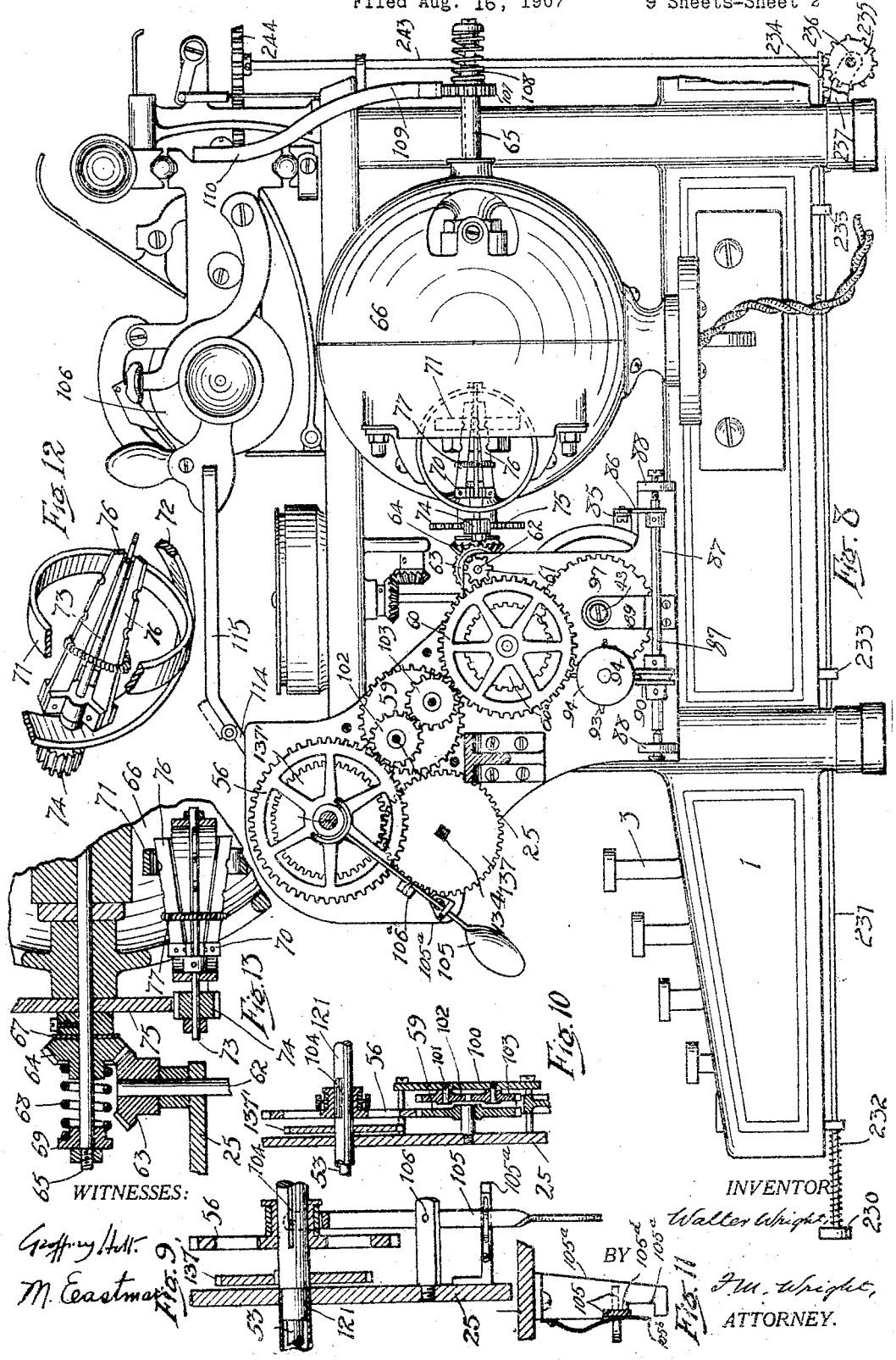

May 27, 1924.
W. WRIGHT
COMPUTING MACHINE AND ATTACHMENT TO TYPEWRITERS
Filed Aug. 16, 1907    9 Sheets—Sheet 3
1,495,967
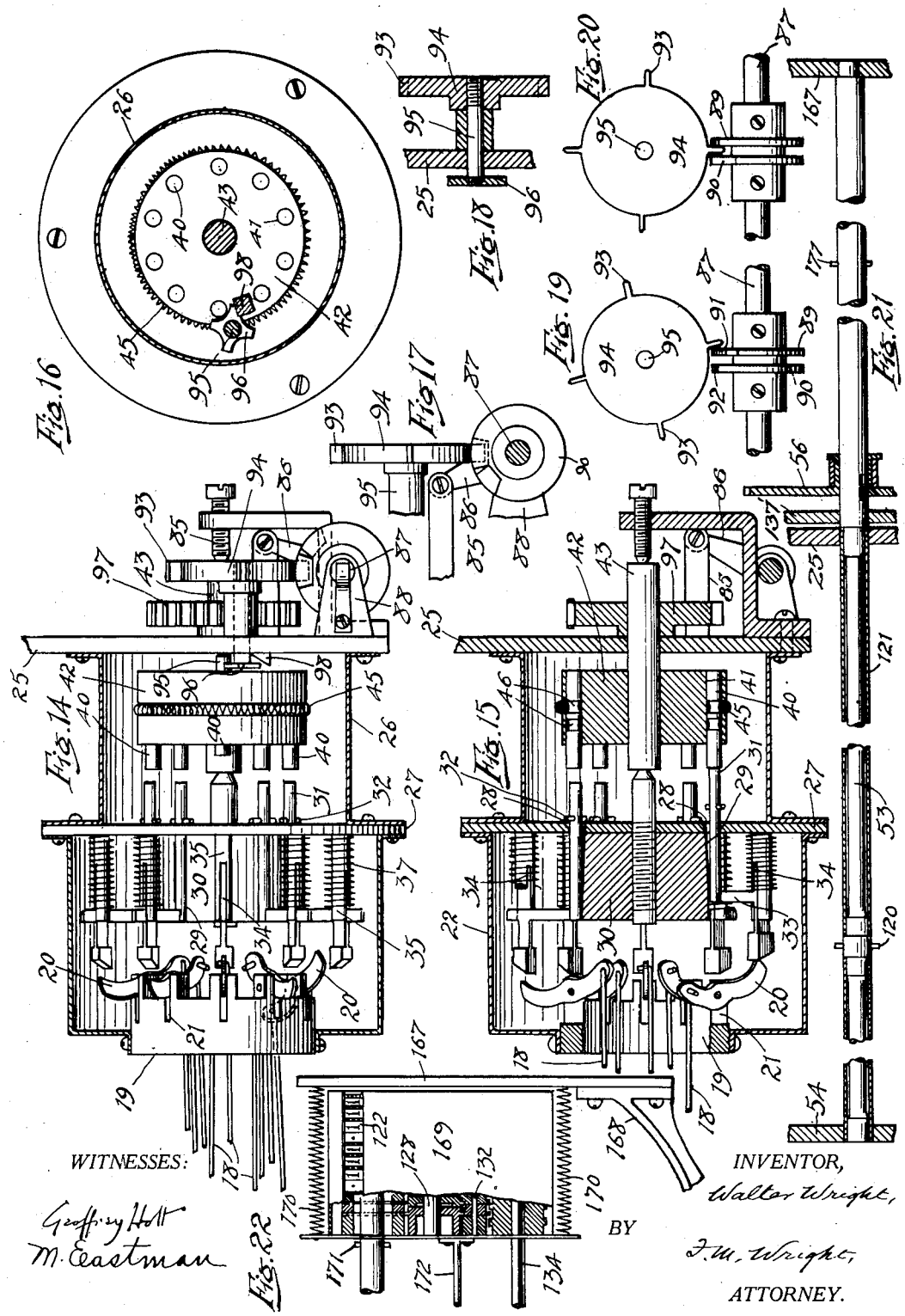
WITNESSES:
INVENTOR,
Walter Wright,
BY
F. M. Wright,
ATTORNEY.

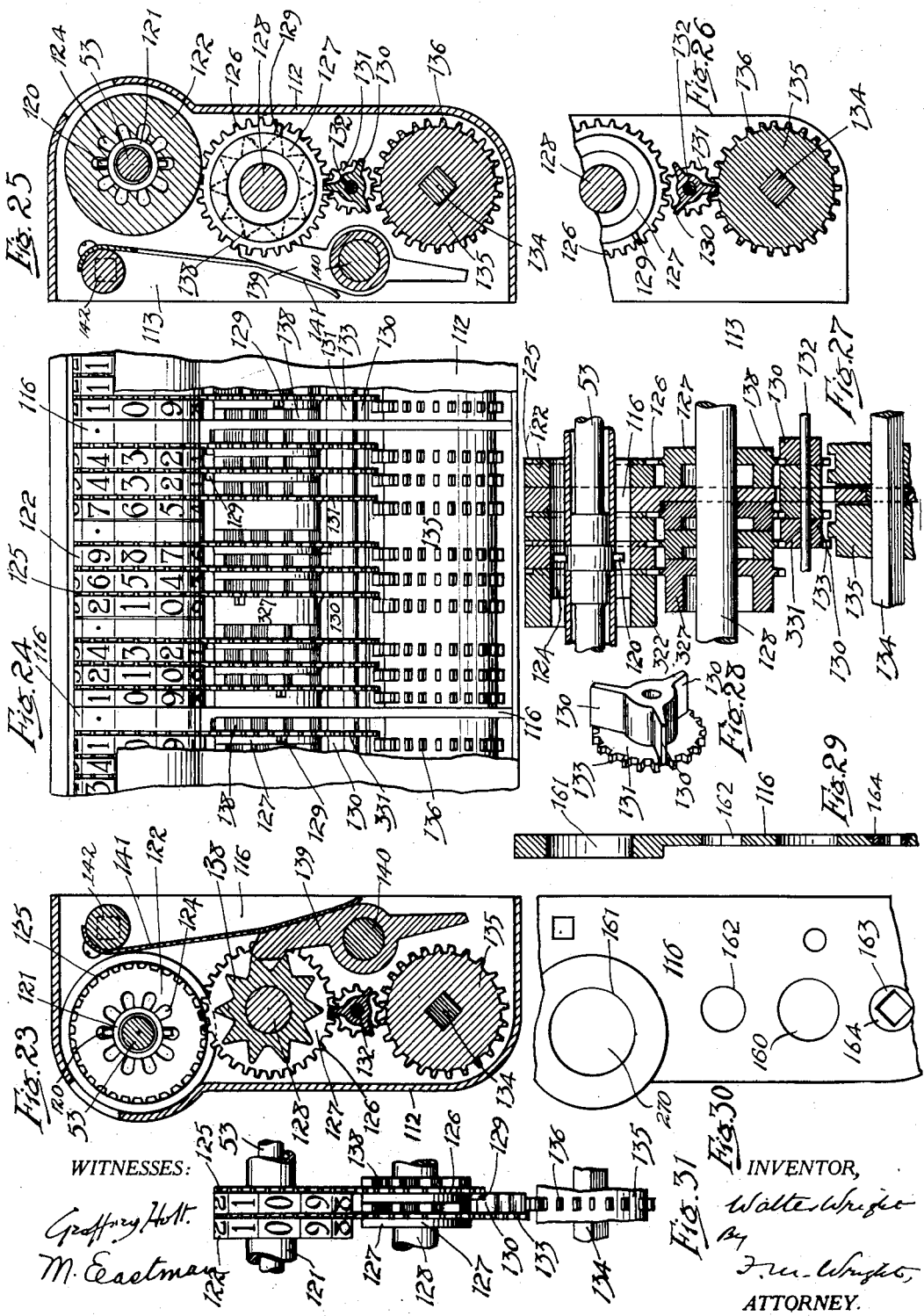

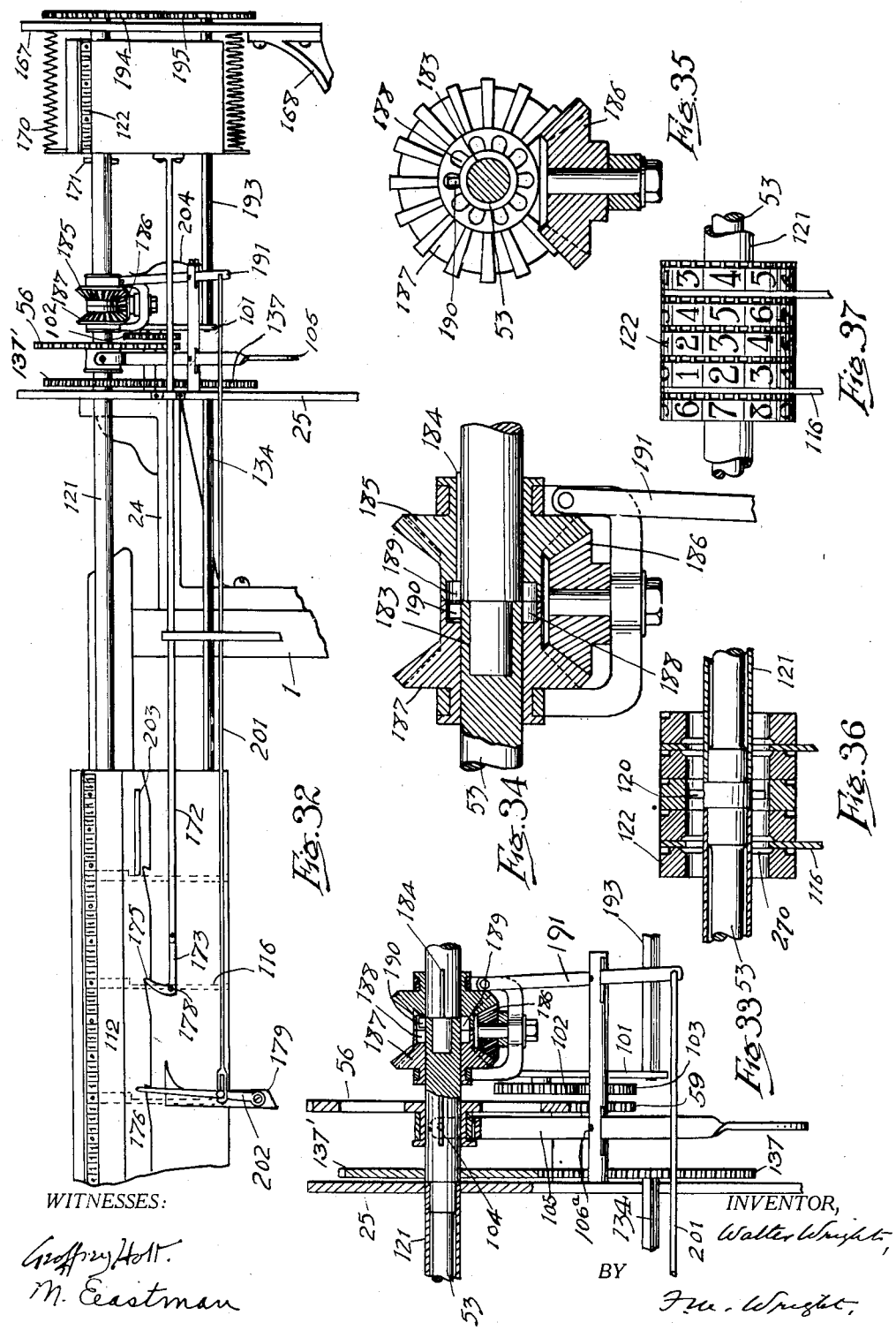

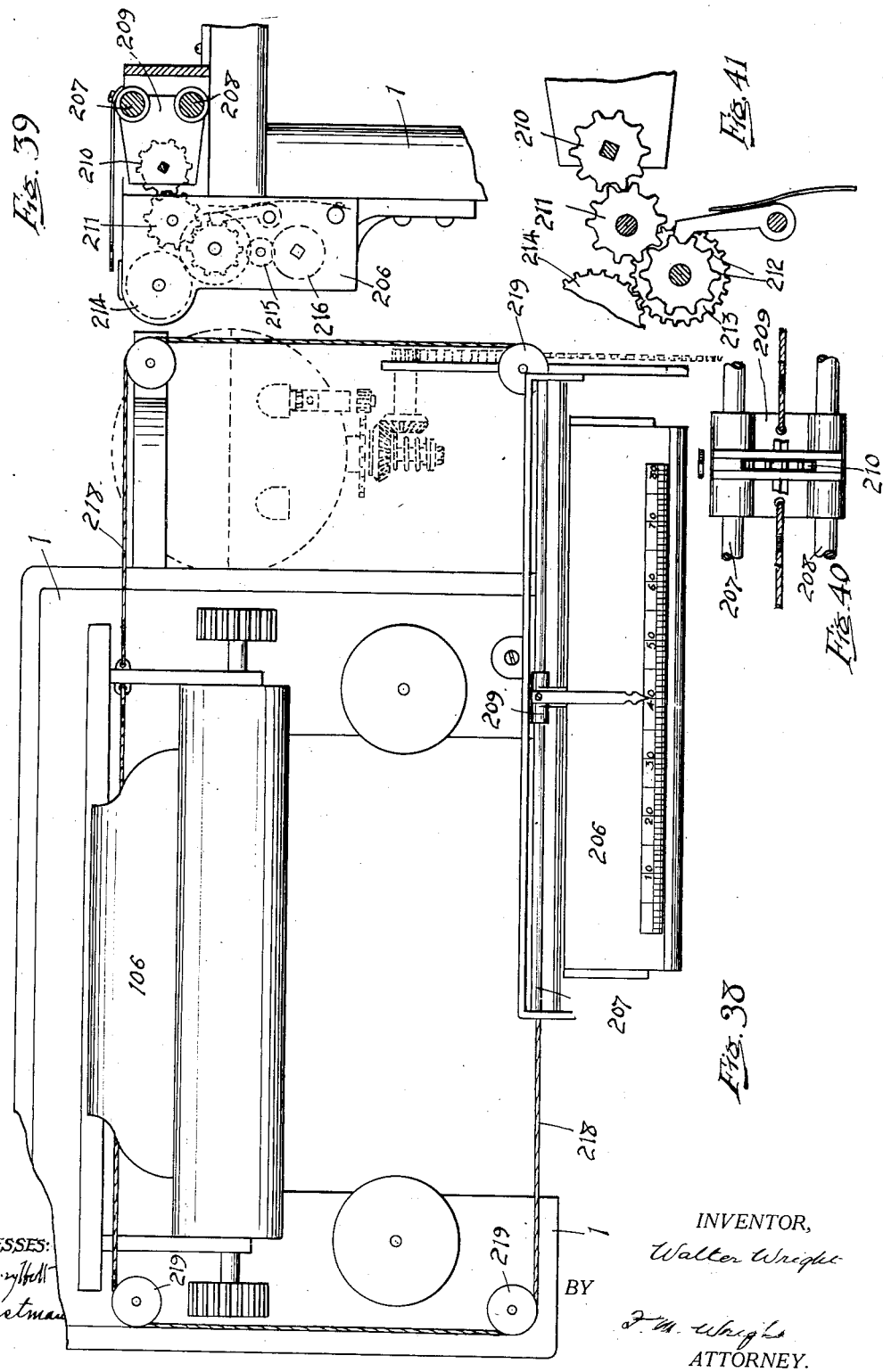

May 27, 1924.

W. WRIGHT 1,495,967

COMPUTING MACHINE AND ATTACHMENT TO TYPEWRITERS

Filed Aug. 16, 1907     9 Sheets-Sheet 7

WITNESSES:
Geoffry Holt
M. Eastman

INVENTOR,
Walter Wright.
BY
F. M. Wright,
ATTORNEY.

May 27, 1924.
W. WRIGHT
COMPUTING MACHINE AND ATTACHMENT TO TYPEWRITERS
Filed Aug. 16, 1907   9 Sheets-Sheet 8
1,495,967
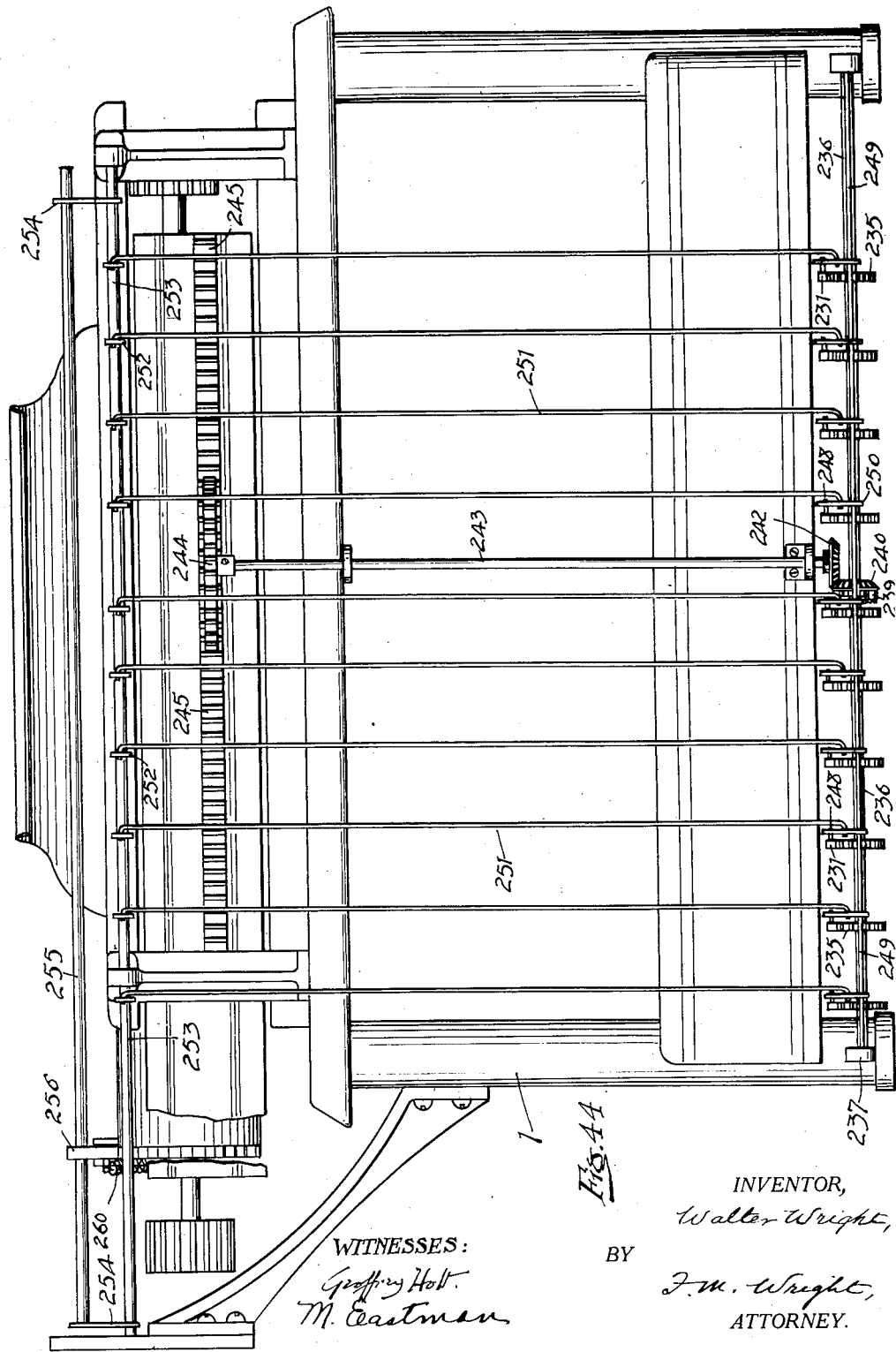

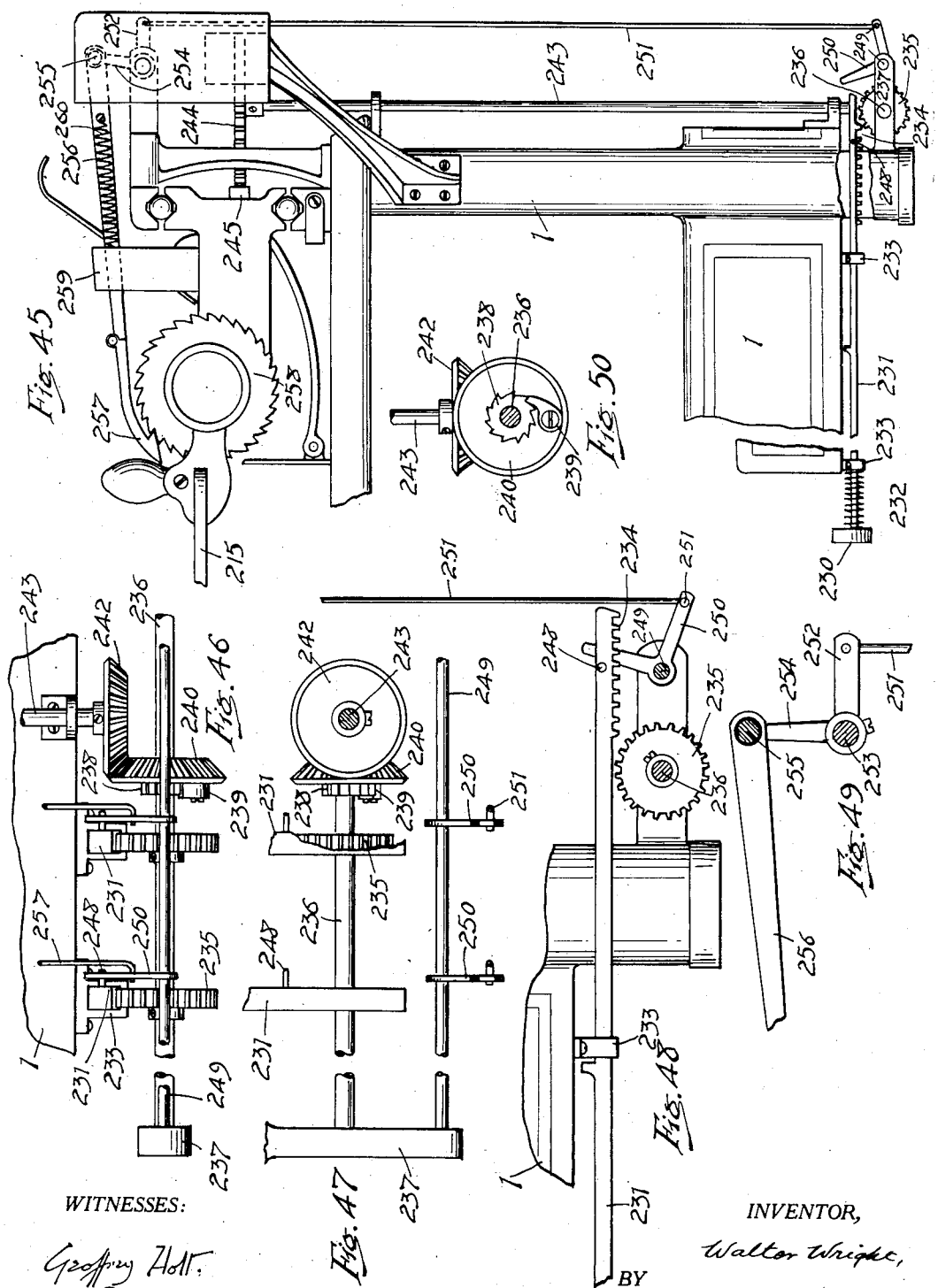

Patented May 27, 1924.

1,495,967

UNITED STATES PATENT OFFICE.

WALTER WRIGHT, OF SAN FRANCISCO, CALIFORNIA, ASSIGNOR, BY MESNE ASSIGNMENTS, TO UNDERWOOD COMPUTING MACHINE COMPANY, A CORPORATION OF NEW YORK.

COMPUTING MACHINE AND ATTACHMENT TO TYPEWRITERS.

Application filed August 16, 1907. Serial No. 388,766.

*To all whom it may concern:*

Be it known that I, WALTER WRIGHT, a citizen of the United States, residing at San Francisco, in the county of San Francisco and State of California, have invented new and useful Improvements in Computing Machines and Attachments to Typewriters, of which the following is a specification.

The object of the present invention is to provide a computing device which can be attached to any standard typewriting machine, to enable said machine to do the work both of a typewriting and of a computing machine. The computing attachment is so designed and constructed that it does not interfere in any way with the free use, and ease of operation, of the typewriter, either when used solely as a typewriter, or for both typewriting and computing. Further, the typewriter to which it is attached is thereby rendered capable of being used not only to perform the functions of a standard adding and computing machine, but also the work of a series of adding and computing machines combined, in connection with the work of a regular typewriter. In fact, it is so constructed that in addition to its work as a typewriter it will perform simultaneously the work of six, eight, ten or even twenty or more of such adding and computing machines, and in volume according to the length of the typewriter and computing carriages, or the length of the writing line of the typewriter, whether fitted with the regular or extra width writing carriage.

Further it will compute and retain the totals of each and all columns, limited in number only by the width of said columns and the length of the writing line for which the writing machine is equipped. It will further compute and register automatically the cross or horizontal totals, as the numbers or amounts are successively written in the different columns with the movement of the typewriter carriage in its regular course from right to left, as the keys of the typewriter are operated for the purpose of printing the numerals on the paper in the ordinary manner.

It will be seen that to perform this object, I have departed from the ordinary methods and general principles heretofore employed in connection with computing machines or computing attachments for typewriters, by dividing the counting wheels of the computing carriage into groups each of three individual and complete counting wheels, each group of three being divided by a regular typewrting space from, and yet operatively connected with and capable of transferring accumulations of the tens to the first wheel of the next group of three counting wheels, to the left and this same principle is employed throughout for the full length of the writing line or width of the typewriter carriage. The same principle can be applied whether using the regular width typewriter carriage or one of extra width; one with 200 or more writing spaces, as well as one with 75 or less.

While this computing mechanism is designed to perform the object already enumerated, namely, that of making perpendicular and horizontal calculations, of a large number of different individual columns at one and the same time, by writing figures in a number of different columns as the typewriter carriage moves from right to left, and as the different columns are written on the paper in a horizontal line across the same, so as to be read from left to right, a further object of this invention is to use said computing device in connection with the typewriter solely as an adding or computing machine and figure writing machine for single column work. Heretofore, single column work has been a special feature of all standard adding and computing machines, such as the Burroughs and others of that character, and this has been looked upon as their special and exclusive field, and one in which no typewriter attachment could successfully invade. Especially has this been true in connection with adding up checks, or doing common accumulating work where only a single column is required and the items and total of said column. In using a typewriter in connection with a computing mechanism for single column work, it has not been possible heretofore for the typewriter, in connection with a computing attachment, to do such work as expeditiously as with the standard adding or computing machines, manufactured especially for this specific purpose. The reason for this has been that, since the typewriter carriage moves from right to left as each character is printed, it is therefore necessary when each item, or row of figures has been written, to return said carriage, space or advance the paper, and move the carriage to the exact point of writing, whether it be cents, dollars, tens, hundreds, thousands, millions, and so forth as the case may be. It is therefore necessary, with the different typewriter attachments now in use, to handle the carriage with the hands, and make it perform a variety of operations which all take time, are unhandy, uncertain, and very apt to produce mistakes in connection with the denomination of figures to which the machine is set, unless much care and time is taken in the operation. These conditions have therefore made the typewriter impractical and undesirable for this particular kind of computation.

For this particular work I provide mechanism by the use of which it is possible to use a typewriter equipped with my computing attachment, as already explained, for single column figure-printing and computing, as expeditiously, or even more so than has been possible heretofore with the standard computing machines constructed especially for this particular work.

A further object is to provide a computing device which can also be used for the operation of subtraction, and thereby also setting to zero, when desired, and which is provided with means for conveniently and quickly changing from the operation of addition to that of subtraction or conversely. A further object is to provide such a mechanism so designed as not to require any change in the pressure required to operate the numeral keys of the typewriter, or to cause any irregular action of the typewriter, or in any other way affect the ordinary operation of the typewriting machine. A further object of the invention is to provide an adding machine in which the pressure for operating each or all of the numeral or letter keys is uniform.

In the accompanying drawings, Figure 1 is a front view of the machine; Figure 2 is a detail view of the universal bar; Figure 3 is an enlarged detail front view of the connecting mechanism; Figure 4 is a side view, partly in section, thereof; Figure 5 is a broken plan view of the mechanism for connecting up with the keys; Figure 6 is a broken perspective view thereof; Figure 7 is a broken detail plan view of the mechanism for controlling the supplementary or cross total mechanism; Figure 8 is a side view of the machine; Figure 9 is an enlarged vertical section showing the shifting mechanism; Figure 10 is a similar section showing the subtracting mechanism; Figure 11 is a detail cross section of the shifting mechanism; Figure 12 is a broken perspective view of the governor; Figure 13 is a broken sectional view of a motor, showing a portion of the governor; Figure 14 is a side view, partly in section, of the rotary controller; Figure 15 is a longitudinal section of the same; Figure 16 is a cross section of the mechanism shown in Figure 14, taken close to the supporting plate; Figure 17 is a broken detail front view of the escapement mechanism, in a different position from that shown in Figure 14; Figure 18 is a sectional view of the same; Figures 19 and 20 are front views in two different positions of the escapement mechanism; Figure 21 is a longitudinal sectional view, partly in side elevation, of the counting shaft; Figure 22 is a broken front view, partly in section, of the supplementary counting mechanism; Figure 23 is an enlarged vertical section of the counting mechanism looking from the right; Figure 24 is a broken front view of a portion of the same; Figure 25 is a view similar to Figure 23, looking to the left; Figure 26 is a broken view similar to Figure 25, showing the parts in a different position; Figure 27 is a broken vertical longitudinal section; Figure 28 is a perspective view of one of the pinions; Figure 29 is a vertical section of a partition; Figure 30 is a side view of the same; Figure 31 is a broken front view of the counting mechanism to show the transmitting train; Figure 32 is a detail front view showing a modification of the means for operating the supplementary computing mechanism; Figure 33 is an enlarged longitudinal section of a portion thereof; Figure 34 is a still more enlarged section of the reversing mechanism therefor; Figure 35 is a cross section through the center of Figure 34; Figure 37 is a broken front view of a modified form of counting wheels; Figure 36 is a longitudinal section of the same; Figure 38 is a broken top plan view, showing a modified form of the invention, using an outside drive; Figure 39 is a cross sectional view of the same; Figure 40 is an enlarged rear view of the carriage; Figure 41 is an enlarged section view showing portions of the computing mechanism; Figure 42 is a broken front view of said modification; Figure 43 is a broken plan view of a further modification showing an outside drive; Figure 44 is a rear view of the machine showing means for shifting the carriage and means for spacing the paper; Figure 45 is a broken end view of the same; Figure 46 is an enlarged broken rear view of said mechanism; Figure 47 is a broken horizontal section of the same; Figure 48 is an enlarged side view of the portion of the same, showing the parts in a different position from that shown in Figure 45; Figure 49 is a broken cross section of a portion thereof; Figure 50 is a broken cross section of another portion.

The drawings show the computing mechanism attached to a typewriting machine. This machine may be of any standard construction, but for the purpose of illustration, there is herein shown a "Monarch" machine. It is, however, to be understood that this invention may be embodied in the form of a computing machine complete in itself, and not attached to a typewriting machine.

Attached to the base 1 (Fig. 1) of the typewriting machine is a vertical plate 2 extending (Figs. 1 and 3) longitudinally of the machine over key levers 3, which plate supports the devices for operatively connecting said levers with escapement and controlling mechanism. Secured upon the front side of said plate 2 is a guide 4 for one end of a slide bar 5, the other end of which is attached to an arm 6 secured to a rock shaft 7 having its bearing in a bracket 8 secured to the base 1, said rock shaft having attached thereto crank arms 9, 10, attached respectively to key stems 11, 12. By depressing one or the other of said keys the shaft 7 is rocked in one direction or the other, and thereby the slide bar 5 is reciprocated.

Through apertures 13 (Figs. 5 and 6) in said slide bar 5 pass links 14, one for each numeral key, the lower ends of which links are hook-shaped, and, by the movement of said bar, are adapted to be moved into or out of engagement with apertured collars 15 secured upon the levers of the numeral keys. When moved into engagement with said collars, then, by the pressure of any numeral key, the corresponding link 14 is also depressed. Said link is connected at its upper end to an arm 16 of a bell crank lever 17, having its bearing in the plate 2, to the end of the other arm of which is connected a wire rod 18, all of said nine connecting rods 18 extending longitudinally of the machine and passing through the central opening of a ring 19, (Figs. 14 and 15) secured as hereinafter described, said rods being connected respectively to the ends of levers 20 arranged to swing in radial slots 21 in said ring. It will be seen that, with the above arrangement, by depressing any one of the numeral keys, the outer end of the corresponding lever 20 is moved to the right. The object of this arrangement is to provide a valuating mechanism which will control the extent of operation of the computing mechanism in accordance with the respective values of the numeral keys actuated. This valuating mechanism will now be described.

Secured to the side of the frame 1 of the typewriting machine, (Figs. 1 and 8) preferably on the right, is a bracket 24 supporting a vertical plate 25, (Figs. 14 and 15) and secured by means of a cylindrical casing 26 attached to the plate 25 is a vertical plate 27, upon which is secured a cylindrical casing 22 to which is secured the ring 19. Said plate 27 has a circular series of ten apertures 28 which are respectively in alinement with grooves 29 in the periphery of a cylinder 30 secured to said plate 27. In said grooves and through said apertures slide trigger pins 31, their movement to the left being limited by cross pins 32, said trigger pins at the left have formed thereon lateral arms 33, which slide in slots 34 formed in posts 35 secured upon the plate 27 coiled springs 37 around said posts tending to return said trigger pins to the left, that is, to their normal position. When any numeral key is depressed and the outer end of the corresponding lever 20 is rocked to the right, as already described, it impinges upon the beveled end of the trigger pin, moving it to the right. This movement, however, is only an instantaneous one, for as soon as the end of the lever 20 passes the end of the trigger pin, so that the latter is freed from said lever, it immediately returns to its normal position under the action of the coiled spring 37. The necessity for this immediate return will presently appear. Since the trigger pin is confined only by the groove and by the aperture 28 in the plate 27, which aperture is comparatively short, the pin has a certain freedom of movement outwards from said groove, and, therefore, when the lever 20 returns upon the removal of pressure from the numeral key, its end can pass the beveled end of the trigger pin, for, by reason of the shortness of the bearing of the pin in its aperture 28, said beveled end can move outwards sufficiently to permit this passage to be made.

This instantaneous action of the trigger is for the purpose of propelling the opposite one of a series of stop bolts or pins 40 corresponding to the series of triggers, which bolts slide in a circular series of slideways 41 in a rotary controller or valuating wheel 42, which is secured to a shaft 43 having bearings in the plates 25 and 27. By mechanism which will be presently described, this controller is caused to rotate upon the depression of any numeral key and when this happens the stop bolt 40 which has been so propelled to the right serves to arrest the controller. In order to hold any bolt in the position to which it has been moved, there is provided an annular coiled spring 45, which surrounds the controller and rests in a groove therein and is adapted to engage one or the other of two grooves 46 formed in each bolt.

53 indicates a shaft, (Fig. 21) which may be termed the counting shaft, because, in the manner hereinafter described, it rotates the counting wheels, and may also be called the master wheel shaft, as will be presently evident. Said shaft has bearings in tubes

121, hereinafter more fully described, secured at their end in the plate 25 and in a plate 54 supported by a bracket 55 (Figs. 1 and 8) secured to the left end of the frame of the machine. Said shaft 53 carries a gear wheel 56 which meshes with a gear wheel 59 which, in turn meshes with a gear wheel 60 which meshes with a pinion 61 on a shaft 62 in a bearing in the plate 25, the other end of said shaft 62 carrying a bevel gear 63, which meshes with a bevel gear 64 (Fig. 13) loose upon the shaft 65 of an electric motor 66, said latter bevel gear 64 being pressed against a friction disk 67 fast on the shaft of the said motor by a coiled spring 68 interposed between the face of said bevel gear and a head 69 secured upon the end of the shaft 65. This arrangement provides means whereby the shaft of the motor may rotate continuously, in readiness to impart rotation through the bevel gears 63, 64, to the counting or master wheel shaft 53, this rotation being imparted, however, only when said counting shaft is released by certain releasing mechanism. In order to ensure the shaft of the motor rotating at a uniform speed, there is provided a governor 70, (Figs 8, 12, 13) comprising a ring 71 attached to a second ring 72 secured to the casing of the motor, in which ring 72 rotates a shaft 73 driven by means of a pinion 74 from a gear wheel 75 on the shaft 65, there being pivoted to said shaft 73 three arms 76, which are normally held together by means of a spring 77 around all of said arms. The rotary motion of the shaft 73 causes said arms to swing outwards against the action of said spring 77, so that said arms press against the interior of the ring 71 and thus sufficiently retard the motion of the shaft 65.

The releasing mechanism hereinbefore referred to is operated by the depression of a numeral key, as follow:—Suspended by hangers 79 (Figs. 1 and 2) at the back of the plate 2 is a universal bar 80, having, for each numeral key, a vertical arm 81 which is adapted to be engaged by a pin 82 extending through a slot 83 in said plate 2 from the bell crank lever of the corresponding numeral key. Upon the depression of the numeral key, said pin moves in said slot to the left, and thereby moves said universal bar to the left against the action of a spring 84. Said universal bar is connected by a rod 85 (Figs. 8 and 17) with a crank arm 86 on a shaft 87, mounted in bearings 88 on the plate 25, and on said shaft 87 is carried an escapement. This escapement comprises two disks 89, 90, (Figs. 8, 19, 20) having cut out of their edges recesses or openings 91, 92, offset from each other, for the purpose of permitting and controlling the passage through them of any one of a series of lugs 93, on an escapement wheel 94, four such lugs being here shown. Said wheel 94 is on a shaft which extends through the plate 25 and carries on the left hand side of said plate a star wheel 96 (Figs. 14, 16, 18) which acts as a rotary controller stop. It has the same number of points as the lugs 93 on the escapement wheel 94, and these points are adapted, by the rotation of said star wheel, to be brought into the path of one of the bolts 40 extruded from the controller by the operation of a numeral key. Previous to the depression of each numeral key, another bolt 40, which has been so extruded by the next preceding depression of a numeral key, still remains extending out from the controller and in engagement with a point of the rotary stop 96, (Fig. 16) the latter being held from rotating by the pressure of a lug 93 of the escapement wheel 94 against the first disk 89 (Fig. 19) of the escapement. Upon the depression of a numeral key, the crank 86 is moved to the left, which causes the disk 89 to rotate through a small angle into a position to permit the lug 93 on the escapement wheel to pass through the opening 91 in the edge of said disk, see Figure 17. This it immediately does, being actuated so to do by the pressure, against the rotary stop, of a stop bolt 40 which was last operated, and this pressure, again, is caused by a rotational force derived from the motor 66 and transmitted to the controller shaft 43 through the double gear wheel 60, 60ª and pinion 97 (Figs. 8 and 15) on said shaft 43. Consequently, as regards the counting, the depression of the key accomplishes two results; first, it extrudes from the controller or valuating wheel a stop bolt 40 corresponding to the particular numeral key depressed, and, second, it moves the escapement wheel a slight distance past the first lug of the escapement into a position so that the lug thereof which was in engagement with the first disk is now between the two disks of the escapement, and pressed against the second disk, and these parts remain in this position until the numeral key is released by raising the finger. As soon as the finger is raised and the key is released, the spring 84 moves the universal bar to the right, thereby moving the crank 86 (Fig. 17) to the right, and the upper portion of the escapement to the right; and thereby moving the opening 92 in the second disk of the escapement into such position that the lug upon the escapement wheel can pass through it. The escapement wheel being now perfectly free to rotate, the star wheel 96 no longer resists the pressure from the previously operated stop bolt, but permits the controller to rotate, the escapement wheel also rotating through nearly a quarter of a revolution, until the next lug 93 thereon brings up against the first disk 89 of the escapement, which is now in such a position that the lug cannot pass through the opening 91. With this movement of the escapement through a quarter of a revolution, the rotary stop or star wheel also moves a quarter of a revolution, so that the next point thereon arrives at such a position as to arrest the stop carried by the controller, and which has been extruded therefrom by the depression of the numeral key just operated. The extent of rotation of the controller depends upon the annular position of the stop bolt 40 which arrests it, and this again depends selectively upon the numeral key the depression of which has extruded said bolt. Corresponding to a given extent of rotation of the controller, the counting shaft 53 is also rotated, and as hereinafter described imparts rotation to the counting mechanism. It will now be seen why it is necessary that any trigger, when operated to propel the stop bolt, should return immediately after effecting such propulsion. For if not so returned, it would be in the way of the rear end of the next stop bolt of the controller, and prevent said controller rotating.

As the controller rotates, the stop bolt 40 which previously engaged the star wheel, and has been permitted to pass the same engages the face of a wedge 98 extending inwardly from the plate 25, and is, by the said wedge, returned to its normal position in the controller ready for subsequent use.

The two disks 89 and 90 are secured adjustably by means of set screws upon the shaft 87, to permit the escapement to be used with the action of any particular typewriter; so that the controller can be released either on the downward stroke of the key, or on the return thereof.

Mechanism is provided whereby the apparatus may be used to perform the operation of subtraction, instead of that of addition, or conversely. (Figs. 8, 9, 10.) For this purpose there is arranged over the wheel 59 a plate 100 attached to the plate 25; and screwed into said plate 100 are pivots 101 for two small intermediate gear wheels 102, 103 meshing with each other, the gear wheel 103 meshing with the gear wheel 60 and the gear wheel 102 meshing with the gear wheel 56. The gear wheel 60 is of sufficient width to engage both the gear wheel 59 and the gear wheel 103 at the same time, so that both of them are driven in the same direction. Consequently, the gear wheel 102 rotates simultaneously with the gear wheel 59, but in the opposite direction thereto. The gear wheel 56 can engage either the gear wheel 59 or the gear wheel 102, but not both at the same time. Said gear wheel 56 is formed with a collar, slidable upon the shaft 53 but rotatable therewith by means of a keyway and key 104 in the usual manner, and it is moved longitudinally upon its shaft by means of a lever 105 pivoted upon a post 106ª. (Figs. 33, 8 and 9.)

From the above construction it results that by moving the lever 105 along the guide arm 105ª into one of its positions of rest (in one of the two seats 105ᶜ, 105ᵈ), the operation of addition is performed by the counting shaft, while when the lever is in the other position, the counting shaft turns in the reverse direction, and the operation of subtraction is performed thereby; the lever being held in either seat by the spring 105ᵇ (Figures 9 and 11).

This part of the mechanism, which enables a rapid change to be made from the operation of addition to that of subtraction, also furnishes an easy and convenient method of resetting all the counting wheels to zero, after either addition or subtraction. Thus, when it is desired to reset the counting or computing wheels to zero, the operator should shift the lever 105 to throw in the subtracting mechanism, if it is not already in, and then strike the numeral keys in succession corresponding to the figures which successively appear at the printing point of the typewriter. Obviously, this has the effect of bringing all the counting wheels to zero.

This part of the mechanism also provides a convenient method of correcting errors in addition or subtraction caused by striking the wrong numeral key. For this purpose the carriage is moved back one space in the same way as an operator moves it back to change an error in typewriting, then the lever 105 is shifted, which reverses from addition to subtraction or conversely, then the operator again strikes the same numeral key which was struck instead of the correct key, and this causes the total of addition or subtraction to be same as it was before said key was struck. Then the operator erases from the sheet the numeral which was so erroneously written by the typewriting machine, and again shifts the reversing lever, and the machine is then in readiness to add or subtract the correct number. This operation occupies but little more time than the correction of a similar error in ordinary typewriting.

The motor 66 (Figs. 1 and 8) may also be employed, if desired, to advance the typewriter carriage 106. For this purpose, there is provided, on the rear end of the motor shaft 65, a pinion 107 connected to said shaft 65 by a friction transmission 108 precisely like that connecting the front end of said shaft with the bevel gear 64. This pinion engages a rack 109, which forms the lower member of a yoke 110, the upper horizontal member 111 being attached to the typewriter carriage. It is obvious that with this arrangement the motor takes the place of the spring generally employed for advancing the typewriter carriage.

The computing carriage 112 (Figs. 1, 8, 32) comprises end plates 113 which are removably engaged by fingers 114 pivoted to arms 115 which extend from the carriage of the typewriting machine. Thereby said computing carriage moves with the typewriter carriage, except when said fingers are raised out of engagement with the carriage 112. It also has vertical partitions 116 (Fig. 1) which are arranged at regular intervals, two of which partitions extend downwards to carry a yoke 117 in which is journaled a wheel 118 which runs upon a fixed rail 119 attached to the brackets 24, 55 and thus removes the weight of the carriage from the shaft 53, and also from a shaft 134, hereinafter referred to.

Referring to Figures 21, 23 and 25, it will be seen that the counting or master shaft 53 is surrounded and supported by two tubes 121 supported by the end plates 25 and 54 and extending inwardly towards each other. Intermediate these tubes there are secured to the shaft 53 one or more teeth 120, two being shown which form a master wheel or actuator for rotating individually a series of counting or computing wheels 122 supported on the tubes 121. These counting wheels can thus move longitudinally on said tubes and can also rotate thereon, when advanced or retracted by progressive addition or subtraction. The interposition of the tubes 121 between the wheels 122 and the shaft 53 has the effect of eliminating any tendency of said wheels to turn owing to the rotation of said counting shaft 53, the only counting wheel so affected by such rotation being that immediately over the teeth 120, and therefore at the writing point of the typewriter. It also avoids wear on the internal gear teeth of the counting wheels (hereinafter described) which would be caused by the counting shaft turning in contact therewith.

The counting shaft is reduced in diameter except at the portions adjacent to the ends of the tubes, thus greatly reducing the friction, since there is no friction of said shaft in said tubes except at the narrow bearings at the ends thereof. This construction has the additional advantage that fine dust, which might settle and accumulate between the counting shaft and the tubes, will produce no effect in increasing the friction of the shaft within the tubes.

Each counting wheel 122 is formed with internal gear teeth separated by ten recesses or notches 124, and, as the typewriter carriage moves to the left, a pair of opposite notches in each counting wheel are, in succession, brought into engagement with the two teeth 120 on the counting shaft, no matter in what angular position said teeth were left by the last preceding operation. Consequently, when the counting shaft is rotated by the mechanism heretofore described, upon the depression or release of any numeral key, the counting wheel which is at the center of said shaft and at the writing point of the typewriter is correspondingly rotated. Each counting wheel has formed on its periphery the ten digits "0" to "9", and is formed on the right hand side with narrow external gear teeth 125 which mesh with similar teeth 126 at the center of a gear wheel 127, all of said wheels 127 turning loosely on a shaft 128. It may be here noted that it is immaterial which of these series of wheels 122, 127, is driven directly, and which of them are idler wheels, and I reserve the right to use either construction. Each wheel 127 has formed on the left hand side a single lug 129, (Figure 25) which, in each revolution of the wheel 127, is adapted to engage one of three arms 130 (Fig. 28) on the right side of a transfer pinion 131, all of said pinions 131 turning loosely on a fixed shaft 132. Each pinion 131 is formed on the left with teeth 133 which engage the teeth 126 of the next wheel 127 to the left. The circumferential distance between the arms 130 being the same as that corresponding to one-tenth of the circumference of the wheel 127, it would follow that, if the pinion 131 were, by the lug 129, advanced through one-third of a revolution, this would cause the next wheel 127 on the left to advance one-tenth of a revolution, and would correspondingly advance the next wheel 122 on the left, thus bringing the next numeral on said counting wheel into a position to be viewed by the operator.

In order to insure that the pinion 131 is thus advanced through one-third of a revolution to advance the counting wheel one-tenth of a revolution, there is provided a transfer shaft 134 (Figs. 23, 25, 26, 27) which is preferably square, and on this shaft are arranged a series of cylinders 135, (Fig. 24) one for each section of the computing carriage between the partitions 116, so that said cylinders can slide on, and rotate with, said shaft 134. Said cylinders are herein shown as moving with the carriage, so that they slide on the shaft 134, but this longitudinal movement of these cylinders is not essential. On each cylinder are formed circular series of teeth 136, the teeth of any series being arranged to engage an arm 130 of the corresponding pinion 131 only when said pinion has been turned by means of the wheel 127. The wheel turns the pinions sufficiently to bring an arm 130 into a position to be engaged by the teeth 136, which then completes the advance of said arm 130, but moves said pinion into such a position that its arm cannot be again engaged by the teeth 136 until said pinion has again been advanced by the lug 129 on the wheel 127.

It will be seen that the rotation of the shaft 134 (Figs. 1, 8, 32,) should be in the opposite direction to that of the shaft 53, and to effect this result, there is secured upon the end of the shaft 134 a gear wheel 137 meshing with a gear wheel 56 on shaft 53.

The wheels 127 are provided on the right hand side with locking teeth 138 (Fig. 23) which are engaged by angular-nosed dogs 139 carried upon a longitudinal rod 140 and pressed against said teeth by springs 141, all secured upon a longitudinal rod 142. The angular form of the nose of each dog permits any counting wheel to be advanced in either direction by the pressure of the tooth 138 against an edge of the nose without providing extraneous means for withdrawing the dog from said locking teeth. If preferred for rapidity of action, the dogs may be positively withdrawn in succession from their corresponding teeth, as they pass the writing point, this being effected by means of a roller carried at said writing point and engaging an arm attached to each dog.

It has heretofore been common to limit the number of operatively connected counting wheels to use in separate boxes, or sections, generally limited to eight or ten counting wheels to a box or section but while I reserve the right to use separate and independent sections I use and have shown herein counting wheels operatively connected for the whole width of the typewriter carriage, as if there were a single such assemblage for the entire length of 80 or more typewriting spaces. It is possible with this construction for a large number of counting wheels to stand at the figure 9, and if an addition is then made to the last wheel so standing, this counting wheel, in advancing to perform the operation of addition, has also to advance through one-tenth of a revolution each of the consecutive wheels to the left, so standing at "9." Should all the wheels, 80 or more in number, be so standing at "9," the advancement of all these accumulating wheels in the usual manner would put a very heavy and excessive load upon the counting wheel operated, and also upon the mechanism for driving the same; and in order to give the machine unlimited capacity, and to prevent any excessive strain or load upon the mechanism, it is preferred to use the transfer shaft 134, and thereby obtain a running action. This transfer shaft extends the full length of the computing carriage and rotates throughout its full length upon the operation of any numeral key. It is therefore obvious that if there are any of the arms 130 of the several transfer wheels in the position to be advanced, that the same will be advanced by the turning of said transfer shaft and the wheel corresponding thereto advanced one-tenth of a revolution. It will be observed that the work of the transfer shaft upon a series of consecutive pinions 131 corresponding to counting wheels standing at "9" is not performed simultaneously for all of them, but in succession on said pinions in the order from right to left. That is to say, as each wheel in turn is moved into position "0," it sets the transfer pinion of the next wheel which is then advanced by the transfer shaft, and thus sets the next counting wheel at "0," and so on through the entire series. By thus distributing the load and dividing it into a series of successive and almost instantaneous actions, instead of requiring the whole of the work to be done instantaneously in a single movement, the strain is taken off the mechanism, and it is possible to throw an unlimited number of such wheels from the position showing "9" to the position showing "0."

In order to provide for the rotation of the transfer shaft, should it be desired at any time, without the striking of a numeral key, there is provided a clearance key 150, which is attached to a vertical slide piece 151, the lower end of which slides in a guide 152, while the upper end is slotted, and in said slotted end 153 is a pin on one arm of a bell crank lever 154, the other arm of which is attached by a wire 155 to a third arm 156 on the rock shaft 17 corresponding to the numeral key "9." The upper end of the link 14 of this numeral key is formed in an elongated slot 157 connected to the arm 16 of the rock shaft, so that the clearance key can be operated without operating the numeral key "9" on the lever connected therewith. The effect of operating the clearance key is therefore (Fig. 1) precisely the same as the effect of operating the numeral key "9" so far as the counting mechanism is concerned, the only difference being that no printing is done and that the typebar and lever on the typewriting machine are not operated. This clearance key should never be operated except at the end of the line or when the carriage is at such a point that one of the partitions or the blank part of a double wheel is at the typewriting point of the carriage, in which case the counting shaft can rotate without operating the counting wheel or causing any rotation of the counting wheel at the writing point or changing the total of the addition in any way, except to throw each wheel to the left of the writing point as may not have been thrown by the last operation of the numeral key.

Before writing the total of any column or columns of figures, the operation of the clearance key will always insure that all the transfers have been made and the total is absolutely correct. Therefore, to give the machine unlimited capacity and elasticity in its operation, and also the additional convenience and advantage of being able to write the maximum number of columns, in proportion to their width capable of being separated on the paper according to the number of writing spaces of the typewriter, the counting wheels are divided into groups of three, each such group being divided from the next by a regular type-writing space, yet operatively connected therewith, and capable of transferring accumulations of ten, through or past said space to the first wheel of the next group of three counting wheels, and this principle is employed for the whole length of the writing line of the typewriter.

In the ordinary typewriter there are "80" writing spaces to the line, therefore the equipment of the ordinary machine, for this width of writing space, with a computing carriage containing computing wheels to correspond therewith, would enable it to be used upon twenty individual and separate columns, each limited to "999" or upon ten columns limited to "999,999," or upon five columns of twice that width, and so on. It will therefore be observed that with this construction, it is possible to utilize the writing space of the typewriter to fit any particular kind of work, either for a single wide column the entire width of the typewriter, or as many as twenty narrow columns (on an ordinary machine), or other intermediate arrangements of columns between the above. This idea can also be applied to an extra wide typewriter carriage, where the writing line is 200 or more spaces just as easily as to the ordinary width machine.

The machine is therefore rendered capable of computing columns with small totals without taking up more space than is actually required, or of adding a column of figures containing as many figures as there are spaces on the typewriter less the decimal or dividing spaces between the hundreds and thousands, and so on, and which are provided for in the following manner.

The computing carriage is so made that each fourth typewriting space of the typewriter can be used for writing a comma or period, without operating or affecting in any way the computing mechanism, the latter being so made that it carries and accumulates through said space, just the same as if it were not there. Each fourth space can also be used for spacing or pointing off the thousands, millions, billions, and so on, or left blank for dividing the total of one column from that of another, in which case the comma or period is not written, and for which dividing slides 166 (Fig. 1) are provided which are moved to cover such fourth spaces.

As shown in the drawings, all the regular computing wheels are of identically the same width as the typewriter writing space. The arrangement of the counting wheels of the computing mechanism into groups of three uniform counting wheels, capable of being operated in connection with, and carrying forward accumulations of ten to, the first wheel of the next series of three counting wheels, is arranged and provided for in one of the two following methods. First, by making each third counting wheel of the series two typewriter writing spaces in width, (Figs. 24, 27) instead of one, but so constructed that said extra width is merely a hollow shell, which allows the pins of the counting shaft to pass therethrough and revolve therein, if desired, without operating the computing wheels or affecting the same in any way through the revolution of the counting shaft. Second, by vertical partitions in the computing carriage, which occupy said fourth writing spaces of the typewriter, and act as divisions of the counting wheels into groups of three or multiples of three. These vertical partitions occupy the space which would be occupied by a fourth computing wheel, if there were a computing wheel made for each writing space of the typewriter. They may be used in every fourth space of the typewriter, or in such fourth spaces as may be desired, wherever it is preferred to use them rather than to make the third wheel of any group of a double width, as already explained. When vertical partitions are used, these partitions are so arranged that the accumulations of ten are carried through said partitions, and transferred in the regular manner to the first wheel of the next group of three counting wheels, exactly as they are carried and transferred from one to the other in each regular group of three counting wheels. The counting wheels of group of three, when these vertical partitions are used, are of identical and uniform width and construction, except for the small transfer wheel, the particular arrangement of which is more fully explained in connection with the construction of the accumulating or computing mechanism. However, it would be included in the scope of the present invention to make the fourth space, which is either that of a partition or of the extra width of a counting wheel, much less, one half or less, than the width of a typewriting space, the extra width thus saved may be divided up between each of the three counting wheels of the group. In speaking therefore of the width of these wheels being that of a typewriting space it is meant that the combined width of three counting wheels of a group, and of the partition or of the extra width of the third wheel is the same as that of four typewriting spaces.

A double width computing wheel is shown at 322 (Fig. 27); a double width gear wheel at 327; and a double width pinion at 331. It is to be observed that the transfer from one set of wheels to the next takes place only through the transfer pinion, and it is therefore necessary that this pinion should only extend through the partitions. The opening 160 (Fig. 30) in the partition is therefore made large enough to permit the transfer pinion to extend therethrough. The opening 270 through which passes the counting shaft is made sufficiently large for the pins on said shaft to pass through and revolve therein. The opening 162, for the shaft 128 is merely of sufficient size to allow said shaft to pass therethrough. In the opening 163 for the square transfer shaft are placed bushings 164 which fit snugly around said shaft, to turn in said opening.

The above arrangement provides for the division of a row of figures into groups of three, universally adopted, except in regard to columns of figures representing money. In the latter case, there are only two figures used to represent the cents, the figures representing mills not being generally used. In order to separate from each other the several columns which are being added at the same time, and to render the totals of said columns easily readable from the figures of the counting wheels displayed, the adjustable slides 166 (Fig. 1) are used. When adding columns of figures representing money, each slide 166 is arranged to cover the third figure of that group of three figures of which the first two show the cents in said money column. It will thus be seen that said slide pieces serve a double purpose, to form distinct marks of separation between the totals of ordinary columns, so as to prevent an error being made in misplacing horizontally the total read from any column; and also to prevent confusion in reading the totals of money figures, by causing only two figures to be shown in the cents column.

I also provide mechanism whereby, simultaneously with the vertical addition of a series of columns of figures, the same figures may also be added in horizontal rows. For this purpose the counting shaft and transfer shaft are extended to the right, their ends turning in a plate 167 (Figs. 1 and 32) supported by a bracket 168, and adjacent to said plate is arranged a horizontal computing carriage 169 which is normally retracted to said plate by means of coiled springs 170, said horizontal computing carriage containing a group of sets of counting wheels, gear wheels, transfer pinions, and transfer cylinders, precisely like those in the main computing carriage, and operated in precisely the same manner. This group is of any preferred size, depending upon the magnitude of the total to which it is required to carry the horizontal addition. The counting shaft, where it extends to the right and passes through said counting wheels is not contained within a tube or tubes, as in the main portion of the machine, but is made of the same diameter as the tubes 121, and has secured thereto a second pair of pins 171, which, in the normal position of the horizontal computing carriage are located just outside the first computing wheel of said carriage. To said carriage is attached a bar 172 which passes through the plate 25 and also through the end plate of the main computing carriage, and has pivoted to its other end a pawl 173 normally pressed upwards by a spring 173ᵃ. This pawl is adapted to engage any one of a series of notches 175 formed on a rack 176 carried by the main computing carriage. When said latter carriage is in its usual initial position, that is, to the extreme right, the pawl engages the notch the farthest to the left on said rack. As the carriage travels to the left, it draws with it the pawl 173 and the bar 172 and therefore also the horizontal computing carriage, against the tension of the springs 170. As the latter carriage moves to the left, the pins 171 upon the counting shaft pass in succession through the counting wheels in said carriage, and, whenever any motion of rotation is imparted to said counting shaft, to advance the counting wheels in the main computing carriage, a corresponding rotation is thereby imparted to that counting wheel, in the carriage 169 which is immediately around said pins. As the main carriage moves to the left so that the right hand end of the first section thereof passes the central or typewriting point, a pin 178 carried by the pawl 173 is engaged by a fixed wedge 179 secured at said central point to the rail 119, which wedge operates to draw the pawl 173 out of the notch 175, and the parts are so arranged that this takes place just at the time that the end of the first section passes the central point. Thereupon the carriage 169 immediately returns to its initial computing position under the action of the springs 170, and the pawl then in like manner engages the second notch on said rack 176, as at Figure 32, which does not show the cross-computing carriage 169 in normal position; the pins or master wheel 171 being shown in position to engage the computing wheel of highest denomination to correspond with the position of the main master wheel; the parts being shown in Figure 32 immediately after the hook 173 has been released from one notch and caught on the next notch. As the main computing carriage continues to move to the left, the horizontal computing carriage now again moves to the left, and any rotation that is imparted to the counting shaft is now again transmitted to the same set of counting wheels as before, that is to say, to each counting wheel of the horizontal computing carriage which corresponds in position to the counting wheel of the section of the main carriage which is being rotated. It will readily be seen that this has the effect of turning the counting wheels of the horizontal computing carriage so as to record the total of all of the numbers of the entire row which had been added by the main carriage. When the operator reaches the end of the row the total of this row may be read off and written down as desired upon the paper, and repeated in the same manner for the next row.

For this purpose there is provided a supplementary counting shaft separate from the main counting shaft having preferably a reduced end adapted to rotate in a socket 183 in the end of the main shaft. Slidable upon said end of the supplementary shaft, but rotatable therewith by means of a keyway 184, is a bevel gear 185 which meshes with a bevel pinion 186 which in turn meshes with a bevel gear 187, the latter being loose upon the end of the main counting shaft. The opposing faces of the bevel gears are each formed with ten notches 188, 189, respectively, and in the end of the main counting shaft is secured a pin 190 adapted to enter any one of said notches. The bevel gears can be moved longitudinally along the shafts by means of a lever 191, to which lever is pivoted the shift yoke which carries the intermediate gear 186. When said lever moves said gears to the left the pin 190 on the end of the main counting shaft enters one of the notches 189 in the bevel gear 185, so that the supplementary shaft rotates with the main shaft either when adding or when subtracting. When the bevel gears are moved to the right, so that the pin 190 enters a notch in the bevel gear 187, then, through the interposition of said bevel gears and pinion, the supplementary shaft is caused to rotate in the opposite direction to the main shaft, so that when the main shaft is performing the operation of addition, the supplementary shaft is performing that of subtraction, and conversely. The transfer shaft 193 for the supplementary or horizontal computing mechanism is now separate from the main transfer shaft, and is driven from the supplementary counting shaft by means of inter-meshing gear wheels 194 and 195 on the respective shafts. The end of the shaft 193 remote from the gear wheel 195 is rotatably supported in a socket in the plate 101.

It is desirable that the reversal of the supplementary computing mechanism should be effected automatically when the typewriter carriage arrives at the desired position on the machine, and for this purpose there is provided a link 201 connected at one end to said lever, and at the other end to an arm 202 pivoted on the fixed wedge 179 which is adapted to be moved by a bar 203 upon the carriage, so as to pull the lever 191 to the left when the carriage arrives at the proper position, thereby reversing the motion of the supplementary shaft relatively to the main shaft. When the carriage returns to its normal position, a spring 204 also returns said lever, so that the supplementary shaft then moves in the same direction as the main shaft.

The operation of this portion of the machine is therefore as follows. After writing a row of numbers in the several columns the operator observes the cross total registered by the supplementary counting mechanism, and copies said cross total at the proper place upon the sheet, to the right of the row of numbers. Since the reversing mechanism is arranged to be brought into operation when the typewriter carriage has arrived at the proper position for the transcription of this cross total, and it being supposed that the main counting shaft has been arranged for the operation of addition, it results that, on writing down the figure registered by each counting wheel of the supplementary mechanism, said counting wheel is rotated in the reverse direction, thereby automatically bringing back the counting wheels one by one to zero, ready for the next line. Thus without any manipulation except by the operation of the numeral keys, said counting wheels can be reset and the cross total of each row written at the end of the row. Having completed all the columns, the operator desiring to write the totals registered for the several columns, shifts the lever 105, so as to cause the main counting shaft to subtract instead of to add. He then copies, at the bottom of each column, the total registered for said column, and thereby the counting wheels registering said total are brought back to zero. While writing down the totals of the several columns and bringing their registering mechanism back to zero, the supplementary counting mechanism is also subtracting. But when that part of the carriage comes to the writing point where the cross totals have been written and where the grand total of both rows and columns is to be written, then the supplementary counting mechanism is automatically reversed, and now performs the operation of addition. If the several cross totals have been copied correctly by the operator and also the totals of the several columns, the number which has been subtracted by the supplementary mechanism, when writing the line of totals, should be the same as that appearing on the main counting wheels corresponding to the column of cross totals, and in that case, on writing down the total of the column of cross totals, the number which has just been subtracted in the supplementary counting mechanism will now be added thereto, and the wheels of the latter will again be brought back to zero in readiness for the next operation. The bringing back to zero of these wheels in the supplementary mechanism when writing the grand total furnishes a double check upon the correct transcription of the figures in columns and rows.

The main and supplementary counting or computing mechanisms may be designated as computing heads and the traveling portions thereof, in this instance including the carriages with the counting or computing wheels, may be called the traveling elements. It is evident, however, that an equivalent structure can be made in which the counting or computing wheels are stationary and the master wheels or actuator having a concomitant movement with that of the typewriter carriage thus forming the traveling elements.

In Figures 38 to 43 is illustrated a construction in which the counting wheels themselves have no longitudinal movement. In this modification the counting wheels are encased in a frame 206 attached to the frame of the typewriting machine. In this frame are two longitudinal bars 207, 208 upon which slides the carriage 209. In said carriage is contained a gear wheel 210, which may be designated as the master wheel and which slides on the counting shaft, which is now made square, and this master wheel meshes in succession with each of a series of gear wheels 211, each of which meshes with teeth 212 of a gear wheel 213, which wheel has gear teeth meshing with gear teeth of a wheel 214, and itself being engaged by a pinion 215, the latter being driven by a transfer cylinder 216. These parts 214, 213, 215, 216, are precisely the same, and co-operate in the same way as the parts 122, 127, 131, 135, respectively, in the first form of the invention, except that there is now no internal drive, either for the wheel 214, or for the wheel 213, their motion being effected by the gear wheels 210, 211.

The carriage 209 moves in the opposite direction to the typewriter carriage, and at the same velocity, and this result may be accomplished either by means of cords or wires 218 attached to the typewriter carriage 106 and to the carriage 209, and passing around pulleys 219, as shown in Figures 38 and 42, or by the means of a rack 223 attached to said carriage 209 driven by a pinion 222, which is driven by a rack 221 attached to the typewriter carriage, as shown in Figure 43.

I also provide means for adapting the attachment for the convenient addition of a single column, by providing for the speedy return of the carriage to, and its arrest at, the proper position for writing the figures in a row of such a column. For this purpose there are provided a number of push keys 230, each suitably indexed. These keys are secured on the ends of rods 231 normally pressed forwards, or toward the operator by springs 232, and sliding in guides 233. Each rod is formed on its under side with a rack 234 adapted to engage a pinion 235 fixed on a horizontal shaft 236 at the back of the machine, having bearings in brackets 237. Said racks are of different lengths, corresponding to the number of typewriting spaces through which it is desired to move the carriage, therefore imparting to said shaft an angular movement, which also varies with said number. Upon said shaft is carried a ratchet wheel 238 which engages a spring-actuated pawl 239 upon a bevel gear 240 loose on the shaft 236 which bevel gear meshes with a bevel gear 242 on the lower end of a vertical shaft 243 which carries at its upper end a gear wheel 244 meshing with a rack 245 formed on the rear of the typewriter carriage. From this it results that, by the movement of any one of said push keys 230, the typewriter carriage is returned the desired distance. For instance, by actuating the push key marked with the numeral 1 the typewriter carriage is moved back one space, by actuating the push key marked "10" it is moved back two spaces, and so on. There are preferably provided two of said indexes, one for figures representing ordinary magnitudes, and the other for figures representing money; one index on the keys, and the other on the machine frame.

It will readily be seen that this construction adapts the machine to add a single column just as quickly, if not more so, than it can be added by the standard adding machines especially made for this purpose.

To further facilitate the printing and adding of a single column, I provide means for automatically spacing the paper upon returning the carriage by the mechanism just described. For this purpose, there is pivotally mounted in the ends of brackets 237 a shaft 249 upon which are loosely mounted bell crank levers 250, one arm of each of which is actuated by a pin 248 carried by the corresponding rod 231 the other arm being connected by a link 251 to the end of an arm 252 upon a shaft 253 at the upper rear portion of the machine, said shaft carrying two arms 254, the ends of which carry a slide rod 255 upon which slides an arm 256, to the end of which is pivoted a hook 257 adapted to engage a ratchet wheel 258 upon the typewriter platen. Coiled springs 260 are used for restoring parts to their normal position. It results that when any one of the push keys has been pushed inwards the hook 257, so engaging the ratchet wheel 258 is suitably guided in a guide 259 mounted upon the typewriter carriage, said guide serving to move the arm 256 longitudinally with the carriage, and preventing its binding upon the slide rod.

It is to be observed that the spacing of the paper by the mechanism just described does not take place until the carriage has been returned to the desired position, for the pin 248 does not engage the bell crank lever 250 until the rack has passed completely over the pinion. By throwing back the hook 257 upon the end of the arm 256, the mechanism for spacing the paper is thrown out of operation, and the carriage can be moved back any desired distance without spacing the paper. This will be found a great advantage in correcting an error in columns, as where an error is discovered in a figure, the typewriter carriage can be quickly and accurately moved back to the position corresponding to the position of the figure which is to be corrected.

In Figures 36 and 37 I have shown a modification of the construction, providing for greater legibility of the figures of the counting wheels for a given size of counting wheels. A regular typewriting space is one-tenth of an inch, and in the form of the counting wheels shown in Figures 25 and 31 said counting wheels have been made of corresponding width, that is, each counting wheel is one-tenth of an inch in width, except when double that width, the partition being also made one-tenth of an inch in thickness. But a greater width may be obtained for the counting wheels by making the partition comparatively thin, one-thirtieth of an inch or less, just sufficient to carry the period or comma necessary to divide the figures into groups of three. The counting wheels on each side of the partition should be cut away, as shown at 270, to permit the pin of the counting shaft when it arrives at the partition to rotate freely in the hole in said partition, and in the recesses in the sides of the counting wheels, without turning any counting wheels. The width of the wheels which cooperate with the counting wheels will be proportionately increased. It will be seen that the internal mechanism of these counting wheels, by means of which they are driven in succession by the counting shaft is not changed in any way, but that said counting wheels are driven in succession by the pin on the counting shaft as the latter advances one typewriter space with each movement of the typewriter carriage. Therefore in the specification and claims, whenever it is stated that the wheels are of such dimensions as to be actuated in succession by the movement of the typewriting carriage through the typewriter spaces one at a time, the statement has reference only to the width of the internal mechanism, which remains the same, even though the width of the outside counting wheels be increased as in the modification just above described.

Of course it is to be understood that whenever desired the partition may be omitted and one of the wheels adjacent thereto may have its width correspondingly increased in order to carry the period or comma.

I claim:—

1. In an apparatus of the character described, the combination of a paper carriage, a main series of counting wheels, a supplementary series thereof, a carriage for each series, means for rotating in unison one counting wheel of each series, and means for intermittently connecting the supplementary carriage with the main carriage, during the progress of a single line of computation along said main series, and for automatically releasing the supplementary carriage from said connection and returning it to its original position.

2. In an apparatus of the character described, the combination of a paper carriage, a main series of counting wheels connected to travel therewith, a supplementary series of counting wheels, means for successively acting upon each counting wheel of the first series, means for successively acting upon each wheel of the supplementary series, mechanism whereby said means are intermittently connected to act in unison during the progress of a single line of computation along said main series, and means for restoring to their normal relative position at such intermissions the supplementary series and the means acting thereon.

3. In a computing machine, the combination of a main series of computing wheels, a supplementary series for computing the horizontal or cross totals of a series of rows of figures corresponding to computations by groups of computing wheels of the main series, means for successively advancing step-by-step computing wheels of the first series, means for advancing step-by-step computing wheels of the second series, first in unison with one group and then in unison with the next succeeding group, and so on, of the main series, and means for restoring the supplementary series to its normal relative position after so advancing it in unison with each group of the main series, during the progress of a single line of computation along said main series.

4. In a apparatus of the character described, the combination of a series of computing wheels, a carriage therefor, means for moving said carriage step-by-step, a supplementary series of wheels for cross computations, means for intermittently advancing step-by-step the wheels of the supplementary series in unison with groups of wheels of the main series, during the progress of a single line of computation for the first series, and means for restoring the wheels of the supplementary series to their normal relative locations at each such intermission, substantially as described.

5. In an apparatus of the character described, the combination of a main carriage, a series of computing wheels carried thereby, a supplementary carriage and a supplementary series of wheels for registering cross computations, means for moving the main carriage step-by-step, means for actuating the wheels of the main series in succession as the carriage advances, a connection between said carriages arranged to be alternately completed and broken as the main carriage advances, during the progress of a single line of computation along the main series, and means for restoring the supplementary carriage to its normal position, when said connection is broken, substantially as described.

6. In an apparatus of the character described, the combination of a typewriter having a carriage and numeral keys, means for printing columns of figures by said numeral keys, a main series of computing wheels, a second series of computing wheels, means dependent upon the operation of the numeral keys for variably rotating said second series of computing wheels in succession in either direction when printing in any column regardless of the direction of movement of the wheels in the main series, and means for intermittently moving said series of computing wheels with the typewriter carriage, and restoring said computing wheels to their original location at each intermission.

7. In an apparatus of the character described, the combination of a typewriter having a carriage and numeral keys, computing wheels, means actuated dependently upon the operation of the numeral keys for rotating said computing wheels in succession in either direction as the carriage moves, and means for reciprocating said rotating means repeatedly to operatively engage the series of computing wheels at different points during a single run of the carriage.

8. In an apparatus of the character described, the combination of a main series of computing wheels, a secondary series, means for rotating computing wheels one of each series in unison in either the same or opposite directions simultaneously, means for operatively connecting said rotating means in succession with computing wheels of the series, means for automatically releasing the same at intervals in the movement of the carriage, substantially as described.

9. In an apparatus of the character described, the combination of means for writing a series of independent columns of figures, a main computing mechanism suitably grouped for obtaining the individual totals of said columns, a supplementary computing mechanism for obtaining the cross totals of the figures in said columns, numeral keys, and means controlled by said keys for rotating both of said mechanisms in either the same or the reverse direction in unison, a paper carriage and means for reversing the direction of rotation of the supplementary mechanism when the paper carriage arrives at a predetermined point of its movement, whereby the supplementary computing mechanism may be brought to zero by writing said totals, substantially as described.

10. In an apparatus of the character described, the combination of means for writing a series of independent columns of figures, main computing mechanism for obtaining the totals of said columns, supplementary computing mechanism for obtaining the cross totals of the figures in said columns, an operative connection between said main and supplementary computing mechanisms, whereby they can act in unison in either the same or the opposite direction, a paper carriage, numeral keys and means controlled by the operation of said keys for advancing said carriage and for actuating said main and supplementary computing mechanisms, and means actuated automatically upon the arrival of the paper carriage at a predetermined point for changing said operative connection, whereby the supplementary mechanism can operate in the reverse direction to the main computing mechanism, substantially as described.

11. The combination with a typewriting mechanism including a carriage, of a unitary set of primary adding wheels which is of sufficient length to be divisible into a variety of irregular groups of adding wheels, a set of gross adding wheels, means for rotating the gross adding wheels in succession concomitantly with corresponding primary adding wheels, and means for intermittently connecting the gross adding wheels with the groups of primary adding wheels successively, during the progress of a single line of computation along the unitary set of computing wheels.

12. The combination with a computing head divisible into sections, of a supplementary computing head operable concomitantly with said first-mentioned computing head, and means for changing the character of action of one of said computing heads at the activity of the final section of said first-mentioned computing head.

13. The combination with a computing head, of a supplementary computing head operable concomitantly with said first-mentioned computing head, said first-mentioned computing head being divisible into sections corresponding in action to individual units, and means for changing the state of said supplementary computing head for the final section of said first-mentioned computing head.

14. The combination with a traveling carriage, of a plurality of computing heads each head comprising a set of independently settable dial wheels, aligned master wheels, one for each of said heads, and means for connecting said heads to said carriage, so as to afford a continuous motion of one of said heads with said carriage and an intermittent motion of another of said heads with said carriage, said heads co-operating with their individual master wheels to effect a concomitant accumulation of the same numbers.

15. The combination with a traveling typewriter carriage, of a plurality of computing heads arranged in longitudinal alignment each head comprising a set of independently settable dial wheels, a plurality of master wheels arranged in longitudinal alignment, one for each of said heads, means for connecting one of said computing heads to said carriage to give a continuous movement thereto, and pick-up means for intermittently connecting another of said heads to move with said carriage during the continuous movement of said head connected for a continuous movement with said carriage.

16. The combination with a typewriter carriage, of a computing head arranged along the front of said carriage, a master wheel for said computing head, a computing head arranged off to one side of said carriage each head comprising a set of independently settable dial wheels, a master wheel for said last-mentioned computing head, means for driving both said master wheels from a common source, means for moving one of said computing heads continuously step by step, and means for moving the other of said computing heads intermittently step by step intermediate return movements which take place during the continuous step-by-step movement of said first-mentioned head.

17. The combination with a plurality of traveling computing heads each head comprising a set of independently settable dial wheels, of independent master wheels for all of said heads, means for affording a drive to all of said master wheels from a single source, and means for giving a concomitant step-by-step movement of said computing heads in the same direction and affording a return motion for one of said heads intermediate a series of step-by-step movements.

18. The combination with a plurality of computing heads arranged in longitudinal alignment each head comprising a set of independently settable dial wheels, of an individual stationary master wheel for each of said computing heads, a common source for driving all of said master wheels concomitantly, and means for according the action of one of said computing heads with several different sections of another of said computing heads, by giving to said computing heads a concomitant movement in the same direction and a relative movement with respect to each other.

19. The combination with a typewriter carriage, of a rack thereon comprising lugs, a hook, means for causing the hook to engage and release the lugs in succession, a rod pivotally connected at one end to said hook, and computing mechanism including a traveling member connected to the other end of said rod.

20. In a combined typewriting and computing machine, the combination with a traveling typewriter carriage, of a main totalizing mechanism and actuating means therefor, a concomitantly operating cross-totalizer, and actuating means therefor, computing wheels being included in said totalizers, means whereby said cross-totalizer actuator engages a given one of said computing wheels in said cross-totalizer a plurality of times in a single traverse of said carriage, and means independent of the main totalizing mechanism whereby said carriage automatically determines whether said wheels in said cross-totalizer when so engaged shall add or subtract.

21. In a combined typewriting and computing machine, the combination with a traveling typewriter carriage, of a main totalizing mechanism and actuating means therefor, a concomitantly operating cross-totalizer and actuating means therefor, computing wheels being included in said totalizers, means whereby said carriage causes said actuating means for said cross-totalizer to engage a given one of said computing wheels in said cross-totalizer a plurality of times in a single traverse of said carriage, and means independent of the main totalizing mechanism whereby said carriage may be made to be thus effective or ineffective at will in its traverse.

22. In a combined typewriting and computing machine, the combination with a traveling typewriter carriage, of a main totalizing mechanism and actuating means therefor, a concomitantly operating cross-totalizer, actuating means for said cross-totalizer, devices whereby a denomination selection may be accomplished between said cross-totalizer and its said actuating means a plurality of times in a single traverse of said carriage, and manually shiftable means independent of the main totalizing mechanism for making said carriage effective or ineffective on said devices at will.

23. In a combined typewriting and computing machine, the combination with a traveling typewriter carriage, of a main totalizing mechanism and actuating means therefor, a concomitantly operating cross-totalizer and actuating means therefor, computing wheels being included in said totalizers, means whereby said actuator for said cross-totalizer engages a given one of said computing wheels in said cross-totalizer a plurality of times in a single traverse of said carriage, means independent of the main totalizing mechanism whereby said carriage automatically determines whether said wheels in said cross-totalizer when so engaged shall add or subtract, and settable means also independent of the main totalizing mechanism for causing said carriage to be ineffective to so cause said cross-actuator engagement, said settable means also disconnecting said determining means.

24. In a combined typewriting and computing machine, the combination with a traveling typewriter carriage, of a main totalizing mechanism and actuating means therefor, a concomitantly operating cross-totalizer and actuating means therefor, computing wheels in said totalizers, means whereby said carriage causes said actuating means for said cross-totalizer to engage a given one of said computing wheels in said cross-totalizer a plurality of times in a single traverse of said carriage, and means whereby said carriage may be made to be thus effective or ineffective at will in its traverse, said last-named means also operating to cause said actuating means for said cross-totalizer to shift from addition to subtraction, when effective, and when ineffective to cause such engagement, also ineffective to shift from addition to subtraction.

25. In a combined typewriting and computing machine, the combination with a traveling typewriter carriage, of a main totalizing mechanism an actuating means therefor, a concomitantly operating cross-totalizer, actuating means for said cross-totalizer, devices whereby a denomination selection may be accomplished between said cross-totalizer and its said actuating means a plurality of times in a single traverse of said carriage, manually shiftable means for making said carriage effective or ineffective on said devices at will, a shifting device for causing said actuating means for said cross-totalizer to add or subtract, and an automatic connection for shifting said shiftable device, said connection made ineffective when said manually shiftable means makes said denomination-selecting devices ineffective.

26. The combination of types, a platen, a letter-feeding carriage, an adding and subtracting mechanism including as one element a gang of computing wheels and as another element a master wheel, means for causing one of said elements to reciprocate during the travel of said carriage, each reciprocation including a step-by-step movement with said carriage and a rapid return movement independently of said carriage, and means dependent upon the movement of said carriage during a single run thereof in letter-feeding direction for causing said mechanism to be set at subtraction at one operation of said traveling element and at addition at a plurality of other operations thereof, said adding and subtracting mechanism also including other gangs of computing wheels and master wheels therefor, to operate concomitantly with the first-mentioned gang and its master wheel.

27. The combination of types, a platen, a letter-feeding carriage, an adding and subtracting mechanism including as one element a gang of computing wheels and as another element a master wheel, releasable means for connecting one of said elements to said carriage to travel therewith in letter-feeding direction to perform a computation, means for automatically disconnecting said connected element from said carriage, means for returning said element after its releasing and automatically re-connecting it to the carriage to perform another computation, a shiftable device for determining whether addition or subtraction shall be performed by said mechanism, and means effective at the end of a plurality of zones and controlled by said carriage for shifting said shiftable device, said adding and subtracting mechanism also including other gangs of computing wheels and master wheels therefor, to operate concomitantly with the first-mentioned gang and its master wheel.

28. The combination with a platen, of a computing mechanism including a traveling element, and mechanism for repeatedly returning said traveling element and said platen to a certain position and simultaneously spacing said platen for a new line.

In testimony whereof I have hereunto set my hand in the presence of two subscribing witnesses.

WALTER WRIGHT.

Witnesses:
FRANCIS M. WRIGHT,
D. B. RICHARDS.